United States Patent
Bergeal et al.

(10) Patent No.: US 9,273,583 B2
(45) Date of Patent: Mar. 1, 2016

(54) EXHAUST SYSTEM FOR A VEHICLE HAVING A "STOP-START" COMPRESSION IGNITION ENGINE

(75) Inventors: David Bergeal, Ware (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 1051 days.

(21) Appl. No.: 12/974,556

(22) Filed: Dec. 21, 2010

(65) Prior Publication Data
US 2011/0146251 A1  Jun. 23, 2011

(30) Foreign Application Priority Data

Dec. 21, 2009 (GB) .................................. 0922194.6

(51) Int. Cl.
| | |
|---|---|
| *F01N 3/00* | (2006.01) |
| *B01J 23/40* | (2006.01) |
| *B01J 23/44* | (2006.01) |
| *B01J 23/48* | (2006.01) |
| *F01N 3/28* | (2006.01) |
| *F02N 11/08* | (2006.01) |

(52) U.S. Cl.
CPC .............. *F01N 3/2828* (2013.01); *F01N 3/281* (2013.01); *F01N 2330/60* (2013.01); *F01N 2510/0682* (2013.01); *F02N 11/0814* (2013.01)

(58) Field of Classification Search
CPC ............ B01J 23/48; B01J 23/40; B01J 23/44; B01J 23/66; B01J 23/54; B01D 53/945
USPC ..................... 60/272–324; 422/177
See application file for complete search history.

(56) References Cited

U.S. PATENT DOCUMENTS

| | | | | |
|---|---|---|---|---|
| 5,258,349 A | * | 11/1993 | Dalla Betta et al. | ........... 502/330 |
| 5,510,086 A | | 4/1996 | Hemingway | |

(Continued)

FOREIGN PATENT DOCUMENTS

| | | |
|---|---|---|
| DE | 19820971 A1 | 11/1999 |
| DE | 10046278 A1 | 3/2002 |

(Continued)

OTHER PUBLICATIONS

International Search Report for PCT International Application No. PCT/GB2010/052148 dated Mar. 23, 2011.

(Continued)

*Primary Examiner* — Audrey K Bradley
*Assistant Examiner* — Anthony Ayala Delgado
(74) *Attorney, Agent, or Firm* — Gary D. Mangels

(57) ABSTRACT

A vehicle comprises a compression ignition engine provided with engine management means and having a catalyst for exhaust gas aftertreatment, wherein the engine management means is configured, when in use, to detect idle conditions and upon determining that idle conditions exist, stops the engine entirely, wherein the catalyst comprises a honeycomb substrate monolith coated with a catalytic washcoat comprising one or more precious metal, which catalytic washcoat being arranged between a first, upstream washcoat zone and a second, downstream washcoat zone, wherein a thermal mass in the first washcoat zone is different from a thermal mass in the second washcoat zone and wherein a washcoat layer in the first, upstream washcoat zone is substantially contiguous with a washcoat layer in the second, downstream washcoat zone.

10 Claims, 1 Drawing Sheet

(56) References Cited

U.S. PATENT DOCUMENTS

| | | | | |
|---|---|---|---|---|
| 6,087,298 | A | * | 7/2000 | Sung ................ B01D 53/945 502/303 |
| 6,827,909 | B1 | * | 12/2004 | Bruck et al. ................ 422/180 |
| 7,837,953 | B2 | * | 11/2010 | Shore ................ 422/626 |
| 8,006,485 | B2 | * | 8/2011 | Twigg et al. ................ 60/295 |
| 2005/0044845 | A1 | | 3/2005 | Onodera et al. |
| 2005/0051125 | A1 | | 3/2005 | Braun et al. |
| 2006/0218894 | A1 | * | 10/2006 | Miwa et al. ................ 60/277 |
| 2007/0238256 | A1 | | 10/2007 | Fischer et al. |
| 2008/0241010 | A1 | * | 10/2008 | Ohno ................ B01D 46/2429 422/180 |
| 2009/0217652 | A1 | | 9/2009 | Bergeal |
| 2009/0257933 | A1 | * | 10/2009 | Chen et al. ................ 423/213.2 |
| 2009/0288402 | A1 | | 11/2009 | Voss et al. |
| 2010/0150792 | A1 | | 6/2010 | Kitamura et al. |
| 2011/0123421 | A1 | * | 5/2011 | Grubert ................ 423/212 |

FOREIGN PATENT DOCUMENTS

| | | |
|---|---|---|
| DE | 102006029914 A1 | 1/2007 |
| EP | 0707883 A2 | 4/1996 |
| EP | 1681450 A2 | 7/2006 |
| FR | 2906483 A1 | 4/2008 |
| GB | 2416717 A | 2/2006 |
| GB | 2427655 A | 1/2007 |
| JP | 2004132224 A | 4/2004 |
| JP | 2005177571 A | 7/2005 |
| JP | 2005299400 A | 10/2005 |
| JP | 2007239467 A | 9/2007 |
| KR | 20030031074 | 4/2003 |
| WO | WO-99/47260 A1 | 9/1999 |
| WO | 9955459 | 11/1999 |
| WO | 0174476 | 10/2001 |
| WO | 2004079167 A1 | 9/2004 |
| WO | WO-2007/077462 A1 | 7/2007 |
| WO | 2008035111 A1 | 3/2008 |
| WO | 2009013610 A2 | 1/2009 |
| WO | 2009144573 A1 | 12/2009 |

OTHER PUBLICATIONS

British Search Report for GB1021497.1 dated Apr. 15, 2011.
Umicore AG & Co. KG; Opposition dated Feb. 16, 2015 to DE 10 2010 063 714 B4 . English Translation Included.
Kreuzer, et al., "Advanced Exhaust Gas Aftertreatment Systems for Gasoline and Diesel Fuelled Vehicles," Catalysis Today 29(1996) pp. 17-27.
Votsmeier, M., et al., "Automobile Exhaust Control", Wiley-VCH Verlag GmbH & Co. KGaA, Weinheim, pp. 1-15 (2005).

* cited by examiner

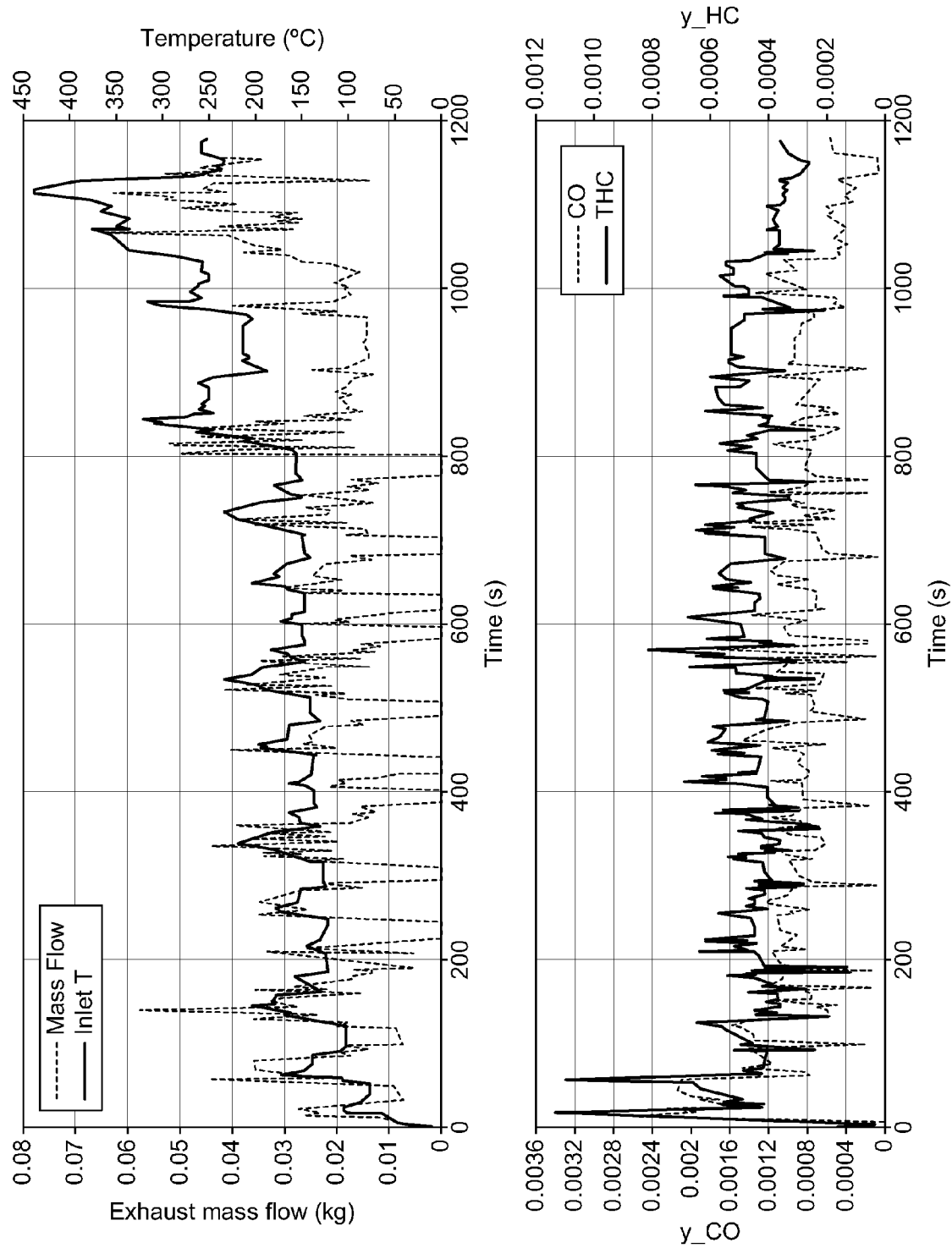

EXHAUST SYSTEM FOR A VEHICLE HAVING A "STOP-START" COMPRESSION IGNITION ENGINE

CROSS-REFERENCE TO RELATED APPLICATIONS

This application claims priority of British Patent Application No. GB 0922194.6, filed on Dec. 21, 2009, the disclosure of which is incorporated herein by reference in its entirety for all purposes.

FIELD OF THE INVENTION

The present invention relates to an exhaust system for a vehicular compression ignition internal combustion engine, such as a Diesel engine, and in particular it relates to an exhaust system for a vehicle comprising a so-called engine "stop-start" system.

BACKGROUND OF THE INVENTION

The emissions from vehicles and internal combustion engines generally are the subject of ever-tightening regulation around the world. Concern about global warming associated with $CO_2$ emissions has led to fiscal incentives in a number of countries to reduce $CO_2$ emissions from vehicles. Increasingly, therefore, private cars and light commercial vehicles are being powered by light duty diesel engines, which have relatively low fuel consumption and relatively low $CO_2$ emissions.

Amongst the strategies being adopted to improve both fuel consumption and emissions for both gasoline spark ignition engines and compression ignition (e.g. Diesel) engines is "stop-start". With a stop-start system, when the vehicle halts for more than a few seconds, the engine is stopped entirely. When the driver needs to move off once more, e.g. depressing the clutch, moving the gear stick, turning the powered steering wheel or, in automatic or semi-automatic vehicles, shifting to "drive", causes the engine to be re-started. Although this causes more load on the battery and starter motor, so that these need to be upgraded, there can be significant savings. The savings in tests under the New European Drive Cycle may, depending on the stop-start system adopted, be of the order of up to 5% of fuel consumption and up to 8% of $CO_2$ emissions. Urban authorities are keen on reducing emissions in towns and cities, and from heavy traffic, so it is likely that stop-start systems will be included in many new vehicles.

Light duty Diesel engines are becoming even more efficient, with electronic control modules and injection technology being combined with mechanical improvements. This means that the exhaust gas temperatures are very much lower than with gasoline engines or heavy duty (truck and bus) diesel engines. Under light load, for example in urban use, and when "coasting" in gear, little or no fuel is being used by such latest design light duty Diesel engines, and the exhaust gas temperatures may, be no greater than about 100-200° C. Despite these low temperatures, advanced catalyst technology can achieve light-off during the New European Drive Cycle, during real-life city driving conditions, low-speed accelerations and steady driving conditions. "Light-off" may be defined as the temperature at which a catalyst catalyses a reaction at a desired conversion activity. For example "CO $T_{50}$" is a temperature at which a particular catalyst causes the conversion of carbon monoxide in a feed gas, for example to $CO_2$, with at least 50% efficiency. Similarly, "HC $T_{80}$" is the temperature at which hydrocarbon, perhaps a particular hydrocarbon such as octane or propene, is converted, e.g. to water vapour and to $CO_2$ at 80% efficiency or greater.

However, under certain circumstances low exhaust gas temperatures can mean that the Diesel Oxidation Catalyst (DOC) may be unable to operate effectively. That is, the DOC may be unable to achieve or to maintain "light-off".

For vehicles not fitted with an engine "stop-start" system, an additional problem arising from operation of the engine under such light load conditions is that whilst the engine is operating, relatively cool exhaust gases, comprising mostly air, continue to pass from the engine through the DOC or other catalyst. This flow of cool gases can cool the DOC to below light-off temperatures. When load is reapplied, for example upon acceleration, the catalyst is unable to meet the desired conversion of the pollutant gases immediately, with the result that emissions of pollutants may be above the regulated levels for a period. In due course, the higher temperature exhaust gases raise the catalyst temperature above light-off temperature once more.

One known DOC design is disclosed in our WO 2007/077462 and comprises a flow-through monolith comprising (numbering from upstream to downstream) first, second and third platinum-group metal-containing washcoat zones. The platinum group metal loading in each of the first and third zones is greater than in the second zone, which is spatially disposed between the first and third zones. The third zone, that is the zone which, when in use, is disposed furthest from the engine, may include a washcoat having a higher thermal mass than the first and second zones, for example by using a thicker washcoat or a washcoat material having an inherently higher thermal mass, such as densified zirconia. Densified zirconia can have a density of 3.5 $g/cm^3$. The three-zone arrangement is designed to maintain catalyst performance at an overall reduced total platinum group metal cost.

SUMMARY OF THE INVENTION

Relative to conventional Diesel engines that remain running at idle, there is generally less variation in catalyst temperature over a drive cycle for a vehicular Diesel engine fitted with "stop/start" technology because the catalyst is not cooled at idle by contact with relatively cool exhaust gas. The inventors have now devised a Diesel Oxidation Catalyst having improved activity for use in treating exhaust gas from Diesel vehicles fitted with such "stop/start" technology. In particular, the inventors have devised an arrangement that balances the competing demands of low catalyst light-off temperature to treat cold-start emissions as quickly as possible, with "light out" where a catalyst may fall below a desired activity during cooler periods of the drive cycle after the catalyst has already "lit-off" following cold-start.

The present invention provides a vehicle comprising a compression ignition engine provided with engine management means and having a catalyst for exhaust gas aftertreatment, wherein the engine management means is configured, when in use, to detect idle conditions and upon determining that idle conditions exist, stops the engine entirely, wherein the catalyst comprises a honeycomb substrate monolith coated with a catalytic washcoat comprising one or more precious metal, which catalytic washcoat being arranged between a first, upstream washcoat zone and a second, downstream washcoat zone, wherein the thermal mass in the first washcoat zone is different from a thermal mass in the second washcoat zone and wherein a washcoat layer in the first, upstream washcoat zone is substantially contiguous with a washcoat layer in the second, downstream washcoat zone.

BRIEF DESCRIPTION OF THE DRAWINGS

In order that the invention may be more fully understood the following Examples are provided by way of illustration only and with reference to the accompanying drawings in which:

FIG. 1 is a graph comparing the computer modelled mass flow (in kg/s), close-coupled DOC inlet temperature, carbon monoxide and total hydrocarbon content (both as molar fractions of the total exhaust gas) of exhaust gas from a 2.4 liter Euro IV bench-mounted vehicular Diesel engine run over the MVEG-B European drive cycle plotted against time.

DETAILED DESCRIPTION OF THE INVENTION

The preferred compression ignition engine is powered by Diesel fuel, but other forms of fuel are also possible including natural gas (NG) and blends of Diesel and biofuel or Fischer-Tropsch process derived fuels.

The honeycomb substrate monolith can be made from a ceramic material such as cordierite or silicon carbide, or a metal such as Fecralloy™. The arrangement is preferably a so-called flow-through configuration, in which a plurality of channels extend in parallel from an open inlet end to an open outlet end. However, the honeycomb substrate monolith may also take the form of a filtering substrate such as a so-called wall-flow filter or a ceramic foam.

In one embodiment, the thermal mass in the first, upstream washcoat zone is greater than the thermal mass in the second, downstream washcoat zone. However, in a presently preferred embodiment, the thermal mass in the first, upstream washcoat zone is less than the thermal mass in the second, downstream washcoat zone.

In either of the preceding embodiments, the honeycomb substrate monolith has a total length. In embodiments, the first, upstream washcoat zone is defined at an upstream end by an inlet end of the honeycomb substrate monolith and at a downstream end by point between 10% and 90%, optionally between 15% and 80% such as between 20% and 30% or 20% and 40%, of the total length of the substrate monolith measured from the inlet end. In preferred embodiments, the length of the inlet zone is less than the length of the outlet zone.

A desirable feature of a low washcoat loading is that its relatively low thermal mass enables it to heat up more quickly and hence to "light-off" more efficiently following cold-start. However, because of the lower thermal mass, the catalyst can also cool down more quickly and in this regard "lighting-out" in the middle of a drive cycle after initially warming up (i.e. post-"light-off") is an undesirable feature. Higher washcoat loadings have the advantage that there is more support material present to support precious metal, and higher precious metal dispersions are possible. The higher washcoat loading can provide greater resistance to thermal ageing in use, i.e. higher thermal durability.

In a particular embodiment, the different thermal mass in the first or second zone relative from the second or first zone respectively is provided by a thicker washcoat layer than is used in the other zone. In this embodiment, a washcoat loading in the thicker washcoat layer may be 4 to 10 $gin^{-3}$, such as from 5 to 8 $gin^{-3}$. Conversely, in the other zone a washcoat loading in the relatively thinner washcoat layer can be from 1 to 3.5 $gin^{-3}$, such as from 2 to 3 $gin^{-3}$.

Alternatively, according to another embodiment, the different thermal mass in the first or second zone relative from the second or first zone respectively may be provided by a washcoat component having a density of at least 3.50 $gcm^{-3}$. Materials having the suitable density may be selected from the group consisting of densified alpha alumina, densified lanthana, densified cerium II oxide, densified cerium III oxide and densified zirconia.

In preferred embodiments, a total precious metal loading, measured as unit weight of precious metal per unit volume of washcoat, in the first, upstream washcoat zone is greater than a total precious metal loading in the second, downstream washcoat zone.

In one embodiment, for example, the first, upstream washcoat zone comprises 55 to 90% of a total precious metal loading of the honeycomb substrate monolith. In another embodiment, the first, upstream washcoat zone comprises 60 to 80% of the total precious metal loading of the honeycomb substrate monolith.

A total precious loading on the honeycomb substrate monolith can be from 15 to 300 $gft^{-3}$, such as from 30 to 150 $gft^{-3}$, e.g. 40 to 120 $gft^{-3}$.

Precious metals for use in the present invention include one or more selected from platinum, palladium, rhodium, gold, silver or mixtures of any two or more thereof. A preferred embodiment subset of precious metals for use in the present invention is the platinum group metals.

Particularly preferred selections of precious metals include platinum per se, palladium per se, a mixture of both platinum and palladium (optionally present as an alloy) or a combination of palladium and gold, either as a mixture, an alloy or both a mixture and an alloy.

In a particular embodiment, the precious metal or combination of precious metals in the first, upstream zone is different from the precious metal or combination of precious metals in the second, downstream zone.

Generally, the or each precious metal is supported on a high surface area refractory oxide component. Suitable precious metal support components include alumina, silica, amorphous aluminosilicates, molecular sieves such as aluminosilicate zeolites, titania, magnesia, magnesium aluminate, ceria, zirconia etc. and mixtures, composite oxides and mixed oxides of any two or more thereof, optionally stabilised with one or more rare earth elements. Particularly preferred mixed oxides include ceria-zirconia, which (depending on the content of ceria) may also include one or more rare earth metals, and alumina doped with silica.

The catalyst for use in the present invention can be located at any convenient point on the vehicle, taking account of packaging and space constraints on the vehicle. Common locations are in the close-coupled location as close to the engine exhaust manifold as possible to take advantage of the hottest possible exhaust gas temperatures. Common alternative locations include the so-called "underfloor" position.

EXAMPLE

The following Example represents the results of a computer model, wherein a cylindrical 400 cells per square inch cordierite flow-through honeycomb monolith substrate having dimensions 143×98×135 mm and a volume of 1.50 L is coated throughout with an homogeneous Diesel Oxidation Catalyst washcoat layer of low (2.5 $gin^{-3}$) or high (7.0 $gin^{-3}$) washcoat loading and a uniform platinum loading (Comparative Example). Zoned Diesel Oxidation Catalysts according to the invention were prepared using the same bare honeycomb substrate monolith and are shown in Table 1.

Methods of preparing zoned honeycomb substrate monoliths are known in the art and include the Applicant's WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support.

The percentage figures shown in the "washcoat loading" column of Table 1 represent the length of the first, upstream zone (far left-hand column) and second, downstream zone relative to the total substrate length as measured from the inlet end of the substrate monolith. The "Pt loading" column represents the platinum metal loading in the first, upstream zone (left-hand column) and the second, downstream zone from left to right, respectively. The CO(g) and HC(g) figures are for carbon monoxide and hydrocarbon present measured at the outlet to the Diesel Oxidation Catalyst. The "Normalised CO(g) Conversion" and "Normalised HC(g) Conversion" is relative to the homogeneously coated low washcoat loaded, 40 gft$^{-3}$ (Comparative Example 2). The total platinum content in all of the Examples was constant.

The mass flow, temperature and engine-out carbon monoxide (CO(g)) and total hydrocarbon (HC(g)) content of the exhaust gas from the 2.4 liter Euro IV bench-mounted vehicular Diesel engine was recorded using a vehicle dynamometer fitted in the so-called close-coupled position as close to the engine exhaust manifold as practically possible (given the space constraints on the vehicle), and these data were used to construct the computer model using modelled catalyst configurations. Although the engine used was not fitted with "stop-start" technology, the effect of such a system was mimicked by turning off the engine whenever the MVEG-B European drive cycle reached idle. The results for mass flow, catalyst inlet temperature carbon monoxide (CO) and total hydrocarbon (THC) content in the exhaust gas is shown in FIG. 1.

The results are shown in Table 1, from which it can be seen that using the homogeneous high washcoat loading (Comparative Example 1) instead of the homogeneous low washcoat loading (Comparative Example 2) lowers the CO and HC conversion over the whole MVEG-B cycle. One plausible explanation for this result is that the catalyst is slower to light-off for CO and HC conversion at the start of the test because of the increased thermal mass of the catalyst.

An improvement in CO oxidation was obtained where the upstream half of the substrate monolith was coated with a low washcoat loading while the downstream half remained coated with a high washcoat loading (Example 3), without adjusting the relative platinum metal loadings between the zones. For the vehicle tested, the reverse arrangement of this configuration (wherein the upstream 50% zone is high washcoat loaded and the downstream half is low washcoat loaded (i.e. Example 4)) gives worse activity than the control. However, the vehicle tested has a particularly cold-running engine and the inventors still believe that the configuration of Example 4 may be particularly useful for a vehicle having an engine that runs hotter (the product offerings of different vehicle manufacturers can vary in MVEG-B on-cycle exhaust gas temperature). Hence, the Example 4 configuration is still regarded as falling within the scope of the present invention. However, the remaining results shown in Table 1 (i.e. for Examples 5-8 inclusive) concentrate on configurations featuring a low loaded upstream zone but varying the length and platinum metal loading of the upstream zone.

It can be seen that by shortening the length of the upstream low washcoat loaded zone to 25% (Example 5), a further improvement in CO oxidation is obtained over the Example 4 configuration. The remaining embodiments (Examples 6-8 inclusive) retained the 25% length inlet zone low washcoat loading/75% length outlet zone high washcoat loading arrangement and investigated changing the platinum metal loading split between the two zones.

A higher (100 g/ft$^3$) inlet zone platinum loading relative to a lower (20 g/ft$^3$) outlet zone platinum loading gave an improved CO conversion, but slightly poorer HC conversion than the homogeneous loaded embodiment (see results in Table 1 for Example 6). However, further iterations of the platinum split (70 g/ft$^3$ upstream zone/30 g/ft$^3$ downstream zone (Example 7); and 85 g/ft$^3$ upstream zone/25 g/ft$^3$ downstream zone (Example 8)) gave similar HC conversion results to those of the homogeneously loaded catalyst but surprisingly improved the CO conversion relative to the higher PGM loaded upstream zone embodiment (i.e. the 100 g/ft$^3$ upstream zone embodiment).

For the avoidance of any doubt, the entire contents of documents cited herein are incorporated herein by reference.

The invention claimed is:

1. A vehicle comprising a diesel engine provided with engine management means and having a catalyst for exhaust gas aftertreatment, wherein the engine management means is configured, when in use, to detect idle conditions and upon

TABLE 1

| Example No. | Washcoat loading/length (g/in$^3$) | | Pt loading/split between zones (g/ft$^3$) | | CO (g) | HC (g) | Normalised CO (g) Conversion | Normalised HC (g) Conversion |
| --- | --- | --- | --- | --- | --- | --- | --- | --- |
| 1 | High | | 40 | | 5.26 | 2.45 | −3% | −2% |
| 2 | Low | | 40 | | 5.12 | 2.41 | — | — |
| 3 | Low 50% | High 50% | 40 | | 4.95 | 2.40 | 3% | 0% |
| 4 | High 50% | Low 50% | 40 | | 5.35 | 2.45 | −4% | −2% |
| 5 | Low 25% | High 75% | 40 | | 4.9 | 2.41 | 4% | 0% |
| 6 | Low 25% | High 75% | 100 25% | 20 75% | 4.79 | 2.43 | 6% | −1% |
| 7 | Low 25% | High 75% | 70 25% | 30 75% | 4.7 | 2.41 | 8% | 0% |
| 8 | Low 25% | High 75% | 85 25% | 25 75% | 4.71 | 2.42 | 8% | 0% | determining that idle conditions exist, stops the engine entirely, wherein the catalyst comprises a honeycomb substrate monolith coated with a catalytic washcoat comprising one or more precious metal and a washcoat component, wherein the one or more precious metal is selected from the group consisting of (i) platinum, (ii) palladium, (iii) a mixture of platinum and palladium, and (iv) a combination of palladium and gold; wherein:

the catalytic washcoat is arranged between an upstream washcoat zone and a downstream washcoat zone;

a washcoat layer in the upstream washcoat zone is substantially contiguous with a washcoat layer in the downstream washcoat zone;

a thermal mass in the upstream washcoat zone is less than a thermal mass in the downstream washcoat zone;

a total precious metal loading in the upstream washcoat zone comprises 55 to 90% of the total precious metal loading of the honeycomb substrate monolith, measured as a unit weight of precious metal per unit volume of washcoat; and the honeycomb substrate monolith has a total length, and the upstream washcoat zone is defined at an upstream end by an inlet end of the honeycomb substrate monolith and at a downstream end by a point between 20% and 40% of the total length of the substrate monolith measured from the inlet end.

2. A vehicle according to claim 1, wherein a greater thermal mass in the downstream washcoat zone relative to the upstream washcoat zone is provided by a thicker washcoat layer in the downstream washcoat zone compared to the upstream washcoat zone.

3. A vehicle according to claim 2, wherein the thicker washcoat layer is provided by a washcoat loading of from 4 to 10 $gin^{-3}$.

4. A vehicle according to claim 2, wherein the upstream washcoat zone has a thinner washcoat layer than the downstream washcoat zone, and wherein the thinner washcoat layer has a washcoat loading of from 1 to 3.5 $gin^{-3}$.

5. A vehicle according to claim 1, wherein a greater thermal mass in the downstream washcoat zone relative to the upstream washcoat zone is provided by a washcoat component having a density of at least 3.50 $gcm^{-3}$.

6. A vehicle according to claim 5, wherein the washcoat component is selected from the group consisting of densified alpha alumina, densified lanthana, densified cerium II oxide, densified cerium III oxide and densified zirconia.

7. A vehicle according to claim 1, wherein the upstream washcoat zone comprises 60 to 80% of a total precious metal loading of the honeycomb substrate monolith.

8. A vehicle according to claim 1, wherein the total precious metal loading on the honeycomb substrate monolith is from 15 to 300 $gft^{-3}$.

9. A vehicle according to claim 1, wherein the precious metal or combination of precious metals in the upstream washcoat zone is different from the precious metal or combination of precious metals in the downstream washcoat zone.

10. A vehicle according to claim 1, wherein the one or more precious metal is a combination of palladium and gold, wherein the combination of palladium and gold is a mixture of palladium and gold, an alloy of palladium and gold, or both a mixture and an alloy of palladium and gold.

* * * * *